(12) United States Patent
Kuroda et al.

(10) Patent No.: US 7,113,188 B2
(45) Date of Patent: Sep. 26, 2006

(54) THREE-DIMENSIONAL DISPLAY APPARATUS AND METHOD

(75) Inventors: Kazuo Kuroda, Saitama (JP); Satoshi Sugiura, Saitama (JP); Shuuichi Yanagisawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 357 days.

(21) Appl. No.: 10/430,192

(22) Filed: May 7, 2003

(65) Prior Publication Data

US 2004/0008156 A1 Jan. 15, 2004

(30) Foreign Application Priority Data

May 9, 2002 (JP) .............................. 2002-134564
Apr. 21, 2003 (JP) .............................. 2003-115362

(51) Int. Cl.
*G06T 15/00* (2006.01)

(52) U.S. Cl. .......................................... 345/426; 345/6

(58) Field of Classification Search .................... 345/6, 345/108, 109, 1.1, 418, 419, 581, 592, 426; 348/756, 56, 51; 353/28, 29; 349/5, 15; 128/916
See application file for complete search history.

(56) References Cited

U.S. PATENT DOCUMENTS 5,745,197 A 4/1998 Leung et al.
5,880,704 A * 3/1999 Takezaki .......................... 345/6
6,602,563 B1 * 8/2003 Kobayashi et al. .......... 428/1.3
6,812,913 B1 * 11/2004 Masazumi et al. ............ 345/94
6,950,078 B1 * 9/2005 Suyama et al. ................. 345/6

FOREIGN PATENT DOCUMENTS

EP 0 959 377 A2 11/1999
JP 07261677 10/1995

* cited by examiner

*Primary Examiner*—Richard Hjerpe
*Assistant Examiner*—Abbas I. Abdulselam
(74) *Attorney, Agent, or Firm*—Young & Thompson

(57) ABSTRACT

A 3D display apparatus (2) is provided with: a plurality of displaying devices (11, 12) which are arranged on a visual line of a viewer (10) in series at a predetermined interval; and a controlling device (31–39) for controlling the displaying devices to respectively display images, so as to show a three dimensional image for the viewer. At least one (11) of the displaying devices except for a displaying device (12) which is positioned farthest from the viewer has an image displaying surface having both of a self-emitting property and a light transparency property.

19 Claims, 10 Drawing Sheets

THREE-DIMENSIONAL DISPLAY APPARATUS AND METHOD

BACKGROUND OF THE INVENTION

1. Field of the Invention

The present invention relates to a 3D (three dimensional) display apparatus and method of a brightness modulation type (i.e., a luminance or intensity modulation type), which can show a 3D) image for a viewer by displaying a plurality of images of an object with changing the brightness of the images and overlapping the images on each other from a view point of the viewer.

2. Description of the Related Art

There is a LC (Liquid Crystal) shutter glass method or the like as a 3D display apparatus, which can show a 3D image of motion picture and can electrically rewrite the 3D) image. This LC shutter glass method shows the 3D image by inputting an image signal, which is composed of image data including parallax information obtained by shooting a picture of a 3D object from several directions, into a 2D display apparatus. A viewer or observer wears a pair of LC shutter glasses. When an odd field image is on the 2D display, the LC shutter for a right eye becomes to be able to transmit a light therethrough and the LC shutter for a left eye becomes to be able to cut off the light. On the other hand, when an even field image is on the 2D display, the LC shutter for a right eye becomes to be able to cut off the light and the LC shutter for the left eye becomes to be able to transmit the light therethrough. In this case, by displaying an image for the right eye in the odd field and displaying an image for the left eye in the even field with two images synchronized, the viewer can perceive the 3D image by watching the two images, including the parallax for the right eye and the left eye, with his eyes.

According to this LC shutter glass method, it is necessary for the viewer to use the pair of LC shutter glasses. For example, it is unnatural to use the pair of LC shutter glasses in a television conference. In physiological factors of 3D viewing, a big contradiction between (i) parallax of two eyes or congestion and (ii) focusing may happen. That is to say, although the LC shutter glass method can satisfy the parallax of two eyes and the congestion since there is a focusing face on a surface of the image, this contradiction makes the viewer's eyes so tired.

On the account, a cubic-volume method which shows the 3D image by placing a plurality of the 2D display apparatuses in front of the viewer is proposed to solve a problem about the above described contradiction between (i) the parallax of two eyes or the congestion and (ii) the focusing. The cubic-volume method can show the 3D image between two of the 2D display apparatuses by displaying a gathering of several 2D images, which are sampled to a depth direction from a view point of the viewer, on two pieces of the 2D display apparatuses which are arranged at a predetermined interval for example. According to this method, which is different from the LC shutter glass method, it is possible to ease the contradiction between (i) the parallax of two eyes or the congestion and (ii) the focusing. However, according to the cubic-volume method, it is difficult to show an object, which is placed at a middle position of the two of the 2D display apparatuses or changes its position in a great magnitude toward the depth direction from the viewer, because the several 2D images are discretely positioned in the depth direction from the viewer.

On that account, a 3D display method of a brightness modulation type is proposed, which can interpolate the interval, even if showing positions of the several 2D images are discrete, by giving a variation to the brightness of the 2D image which is shown on each of two pieces of the 2D display apparatuses. According to this brightness modulation method, it is possible to ease the contradiction between (i) the parallax of two eyes or the congestion and (ii) the focusing, and is possible to ease eyestrain or the like. Also, the brightness modulation method has an advantage, which is to decrease an amount of data in showing the 3D image, because it is possible to make the viewer perceive the object existing in the middle position of the two image surfaces three-dimensionally and further to show objects existing on a plurality of surfaces.

However, this brightness modulation method has such a problem that the 3D display apparatus cannot show the image of a semitransparent object or the image through which the viewer can watch an object at the back of the image.

To this problem, the brightness modulation method which can show the image of a semitransparent object and the image through which the viewer can watch the object at the back of the image, by overlapping and showing the images of the object on several 2D display apparatuses by using a plurality of half mirrors, is proposed by the Japanese Patent Application Laying Open NO. 2000-115812.

However, in this method, the 3D display apparatus is large in scale and is so complicated that the 3D display apparatus cannot meet general requirements of miniaturization, light-weight and cost reduction in the concerned technical field because the 3D display apparatus includes a plurality of optical elements such as half mirrors and the like.

SUMMARY OF THE INVENTION

It is therefore an object of the present invention to provide a 3D display apparatus and a 3D display method of the brightness modulation type, which can show the advanced 3D image with a relatively small-sized and simple structure.

The above object of the present invention can be archived by a 3D display apparatus provided with: a plurality of displaying devices which are arranged on a visual line of a viewer in series at a predetermined interval; and a controlling device for controlling the displaying devices to respectively display images, so as to show a three dimensional image for the viewer, at least one of the displaying devices except for a displaying device which is positioned farthest from the viewer comprising an image displaying surface having both of a self-emitting property and a light transparency property.

According to the 3D display apparatus of the present invention, the displaying devices are arranged in series at the predetermined interval on the visual line of the viewer. The "visual line" of the present invention means a visual line or axis, or a line of vision of an ideal or real viewer, who watches the 3D display apparatus of the present invention such that he or she may perceive the 3D image. At least one displaying device except for the displaying device positioned farthest from the viewer (hereunder, which is simply referred to as "the backmost displaying device" as the occasion demands), includes the image displaying surface having the self-emitting property as well as the light transparency property. Thus, this at least one displaying device can display the image by self-emitting and, when it is not illuminating, can pass therethrough a light coming from the back side thereof.

In operation, under the control of the controlling device, for example, the displaying devices respectively display the images of the same object (for example, a same image of the object or images of the same object, sizes of which are different from each other, or the like), whose brightness is varied between the displaying devices, at a substantially same screen position of each of the displaying devices. Therefore, the viewer can watch one image displayed by the displaying device positioned at a forward position (hereunder, which is simply referred to as "the forward displaying devices" as the occasion demands), which is overlapped on another image displayed by the displaying device positioned at a backward position (hereunder, which is simply referred to as "the backward displaying device" as the occasion demands) through the forward displaying device. That is, the viewer existing on the visual line can perceive a 3D image of the brightness modulation method.

Alternatively, for example, the displaying devices may respectively display the images of the different objects, whose brightness is varied between the displaying devices in response to the position or depth of each object with respect to the viewer, at different screen positions of each of the displaying devices. In this case, the viewer existing on the visual line may also perceive a 3D image of the brightness modulation method.

Especially in the present invention, every one of the displaying devices placed in the above described manner or at least one of the displaying devices except for the backmost displaying device includes a displaying device comprising the image showing surface having both of the self-emitting property and the light transparency property. For this, for example, EL display unit can be used. On the other hand, the backmost displaying device has no need to have transparency because an image coming from the back of the backmost displaying device doesn't exist. For the backmost displaying device, for example, an LCD (Liquid Crystal Display) unit, a Plasma display unit, a CRT (Cathode Ray Tube) display unit or the like may be used.

In the present invention, it is adequate to use at least two display devices as the plurality of display devices. In this case, the viewer perceives the 3D image, which is shown at a position associated with the brightness of the image shown by each of the two displaying devices, between the two displaying devices. It is also possible to construct to include three displaying devices, each of which is associated with respective one of the color RGB signals. Further, it is possible to construct to show a broadcasted picture and to show the 3D image, which is overlapped on the broadcasted picture.

Above described, according to the present invention, a small sized and easy controlled 3D display apparatus of the brightness modulation method which has no need to have the optical element like a plurality of half mirrors for overlapping or mixing a plurality of images of the object, as in the above described Japanese Patent Application Laying Open NO. 2000-115812 for example, is realized by using the displaying device having the self emitting property as well as the light transparency property.

Incidentally, in the present invention, all of the displaying devices except for the backmost displaying device may be constructed by the displaying device having the light transparency property like the EL display unit or the like. Alternatively, just one displaying device except for the backmost displaying device may be constructed by the displaying device having the light transparency property like the EL display unit and other display units except for the just one displaying device and the backmost displaying device may be constructed by a displaying device not having the light transparency like the LCD unit or the like, which is placed to show the image through the half mirror.

In one aspect of the 3D display apparatus of the present invention, the controlling device controls the displaying devices to respectively display the images of a same object at a substantially same screen position of respective one of the displaying devices.

According to this aspect, the displaying devices respectively display the images of the same object, whose brightness is varied between the displaying devices, at a substantially same screen position of each of the displaying devices. Therefore, the viewer existing on the visual line can perceive a 3D image of the brightness modulation method.

In one aspect of the 3D display apparatus of the present invention, the controlling device controls the display devices such that one of the displaying devices which is positioned forward displays one image of the same object with a higher brightness than other of the displaying devices positioned backward if the three dimensional image is to be shown nearer to the viewer, and such that one of the displaying devices which is positioned backward displays one image of the same object with a higher brightness than other of the displaying devices positioned forward if the three dimensional image is to be shown farther from the viewer.

According to this aspect, the controlling device controls the brightness of the image shown on each of the displaying devices in order that the viewer can perceive the image of the object as the 3D image. For example, the controlling device makes the brightness of the image, which is shown on the forward displaying device, high and makes that of the image, which is shown on the backward displaying device, low, so as to make the viewer perceive the 3D image at nearer position from the viewer. Then, the viewer can perceive the 3D image as shown at the near position to the forward displaying device. On the other hand, the controlling device makes the brightness of the image, which is shown on the forward displaying devices, low and makes that of the image, which is shown on the backward displaying device, high so as to make the viewer perceive the 3D image at the further position from the viewer. Then, the viewer perceives the 3D image as shown at the near position to the backward displaying device. Therefore, the viewer existing on the visual line can perceive the 3D image of the brightness modulation method.

In this aspect, the controlling device may further control the displaying devices such that a sum of the brightness of the displaying device positioned from forward to backward position is kept to be a predetermined value.

By constructing in this manner, the controlling device can prevent the screen from flicking accompanying the variation of the brightness because the brightness which is composed of the brightness of all displaying devices is kept to be the predetermined value (e.g., one value or constant value) in any cases by control of the controlling device.

In another aspect of the 3D display apparatus of the present invention, the controlling device controls the brightness on the basis of a distance from a camera device for shooting the image of the same object to the same object.

According to this aspect, controlling of the brightness of the image shown on the 3D display apparatus of the present invention is performed on the basis of the distance from the camera device to the object. The distance from the camera device to each object is measured by a distance measuring device for example, and is recorded in correspondence with the image information, as the distance information. As the object is near to the camera device, the brightness of the forward displaying device is higher than that of the backward displaying device. On the contrary, as the object is far from the camera device, the brightness of the forward displaying device is lower than that of the backward displaying device. Therefore, a distance relationship in shooting the image of the real object can be reproduced. To measure the distance, for example, a method using ultrasonic, infrared light or the like may be employed.

In another aspect of the 3D display apparatus of the present invention, the 3D display apparatus further provided with an input device through which the brightness is set to be a desired value.

According to this aspect, the viewer or producer can set the brightness of the image to be the desired value through the input device. Therefore, the viewer can freely set a relationship of a position of the object and perceive the 3D image. It may be important to design the relationship of the position of the object in showing an image, which is produced by a computer especially. As the input device, for example, a method of performing by programming in computer or that of designing by an input unit like a keyboard while perceiving the image may be employed.

In another aspect of the 3D display apparatus of the present invention, the at least one of the displaying devices self-emits such that an amount of a self-emitted light directed toward the viewer is more than that directed away from the viewer.

According to this aspect, as to the forward displaying device or the displaying device except for the backmost displaying device, the amount of the light emitted in the direction of going away from the viewer is less. Therefore, the amount of the light constituting the image noise coming toward the viewer, which is generated by a reflection of the light emitted in the direction of going away from the viewer onto a surface of the displaying device which is placed at the back of the emitting displaying device, can be reduced. As a result, a quality of the 3D image can be improved.

In another aspect of the 3D display apparatus of the present invention, the at least one of the displaying devices has a half mirror on a back side thereof.

According to this aspect, as to the forward displaying device or the displaying device except for the backmost displaying device, it is possible to decrease or cut off the light emitted in the direction of going away from the viewer by the half mirror. Therefore, the amount of the light constituting the image noise coming toward the viewer, which is generated by a reflection of the light emitted in the direction of going away from the viewer onto the surface of the displaying device placed at the back of the emitting displaying device, can be reduced.

Incidentally, the above described half mirror is preferably placed in a vicinity of the displaying device or at a predetermined interval from the displaying device perpendicularly to the same visual line. The above described half mirror preferably overlaps with this displaying device or faces to this displaying device. Therefore, it is possible to prevent the optical system from becoming large-sized due to the existence of the half mirror.

In another aspect of the 3D display apparatus of the present invention, the at least one of the displaying devices has a filter on a back side thereof, such that an amount of a self-emitted light directed away from the viewer through the filter is less than that directed toward the viewer through the filter.

According to this aspect, as to the forward displaying devices or the displaying device except for the backmost displaying device, it is possible to decrease or cut off the light emitted in the direction of going away from the viewer by the filter. Therefore, the amount of the light constituting the image noise coming toward the viewer, which is generated by the reflection of the light emitted in the direction of going away from the viewer onto the surface of the displaying device placed at the back of the emitting displaying device, can be reduced In another aspect of the 3D display apparatus of the present invention, the at least one of the displaying devices has a polarizing plate on a back side thereof.

According to this aspect, as to the forward displaying device or the displaying device except for the backmost displaying device, it is possible to decrease or cut off the light emitted in the direction of going away from the viewer by the polarizing plate. Therefore, the amount of the light becoming to the image noise coming toward the viewer, which is generated by the reflection of the light emitted in the direction of going away from the viewer onto the surface of the displaying device placed at the back of the emitting displaying device, can be reduced. Especially, if the polarizing plate is set to be able to permeate the light of the image of the object displayed by the backward displaying device, the well-bright 3D image can be shown.

In another aspect of the 3D display apparatus of the present invention, the at least one of the displaying devices is anti-reflection processed on a back side surface thereof.

According to this aspect, a reflection of a light, which is emitted from the forward displaying device to backward, on the surface of the backward displaying device or the backmost displaying device is effectively prevented by the anti-reflection film, layer or coating. As a result, the image noise going toward the viewer, which results from the light reflection, can be reduced.

In another aspect of the 3D display apparatus of the present invention, the other of the displaying devices positioned backward is anti-reflection processed on a front side surface thereof.

According to this aspect, the reflection of the light, which is emitted from the forward displaying device to backward, on the surface of the backward displaying device or the backmost displaying device is effectively prevented by the anti-reflection film, layer or coating. As a result, the image noise going toward the viewer, which results from the light reflection, can be reduced.

In another aspect of the 3D display apparatus of the present invention, the other of the displaying devices positioned backward has a light scattering plate on a front side surface thereof.

According to this aspect, the light which is emitted from the forward displaying device backward is scattered by the light scattering plate before the light arrives at the surface of the backward displaying device or the backmost displaying device. Therefore, the reflection of the light, which is emitted backward, on the surface of the backward displaying device or the backmost displaying device is effectively prevented by the light scattering plate. As a result, the image noise going to the viewer, which results from the light reflection, can be reduced.

Incidentally, an arbitrary combination of the above mentioned aspects for the forward displaying device and/or for the backward displaying device can make the quality of the 3D image further improved.

In another aspect of the 3D display apparatus of the present invention, the at least one of the displaying devices comprises an EL element.

According to this aspect, the displaying device, like the EL display unit or the like comprising the EL element, is superior in both of the self-emitting and the light transparency. Thus, it is possible to produce a thin and small-sized displaying apparatus as the 3D display apparatus and it is preferable to use the displaying device like the EL display unit to construct the 3D display apparatus of the present invention.

In another aspect of the 3D display apparatus of the present invention, the displaying device positioned farthest from the viewer comprises an image displaying surface not having the light transparency property.

According to this aspect, as to the backmost displaying device which has no need to have the light transparency, for example LCD unit, plasma display unit, CRT display unit or the like can be used. It is possible to improve the cost-performance and the capacity efficiently as to the entire 3D display apparatus.

However, it is possible to construct the backmost displaying device by using the EL display unit or the like, having the self-emitting and the light transparency, like other displaying device. Even this construction, as long as the displaying device having the self emitting and the light transparency is used as the backmost displaying device, several advantage of the above described present invention can be suitably obtained.

The above object of the present invention can be archived by a 3D display method using the above described 3D display apparatus of the present invention, the method including the processes of: generating image signals for the displaying devices to respectively display the images; and controlling the displaying devices on the basis of the generated image signals to respectively display the images of a same object at a substantially same screen position of respective one of the displaying devices.

According to the 3D display method of the present invention, the displaying devices are disposed on the viewer's same visual line in series at the predetermined interval in the same manner as the above mentioned 3D display apparatus of the present invention. By the controlling process, the displaying devices respectively show the images of the same object whose brightness is varied between the displaying devices. The viewer can watch the image displayed by the forward displaying device, which is overlapped on the image displayed by the backward displaying device through the forward displaying device. That is, the viewer existing on the visual line can perceive a 3D image of the brightness modulation method.

Especially in the present invention, every one of the displaying devices placed in the above described manner or at least one of the displaying devices except for the backmost displaying device includes a displaying device comprising the image showing surface having both of the self-emitting property and the light transparency property. Therefore, a small-sized and easy controlling 3D display apparatus of the brightness modulation method which has no need to have the optical element like a plurality of half mirrors for overlapping or mixing a plurality of images of the object, as in the above described Japanese Patent Application Laying Open NO. 2000-115812 for example, is realized In one aspect of the 3D display method of the present invention, the controlling process includes the processes of: controlling the display devices such that one of the displaying devices which is positioned forward displays one image of the same object with a higher brightness than other of the displaying devices positioned backward if the three dimensional image is to be shown nearer to the viewer; and controlling the display devices such that one of the displaying devices which is positioned backward displays one image of the same object with a higher brightness than other of the displaying devices positioned forward if the three dimensional image is to be shown farther from the viewer.

According to this aspect, the controlling process controls the brightness of the image shown on each of the displaying devices in order that the viewer can perceive the image of the object as the 3D image. For example, the controlling device makes the brightness of the image, which is shown on the forward displaying device, high and makes that of the image, which is shown on the backward displaying device, low, so as to make the viewer perceive the 3D image at nearer position from the viewer. Then, the viewer can perceive the 3D image as shown at the near position to the forward displaying device. On the other hand, the controlling device makes the brightness of the image, which is shown on the forward displaying devices, low and makes that of the image, which is shown on the backward displaying device, high so as to make the viewer perceive the 3D image at the further position from the viewer. Then, the viewer perceives the 3D image as shown at the near position to the backward displaying device. Therefore, the viewer existing on the visual line can perceive the 3D image of the brightness modulation method.

In another aspect of the present invention, the controlling process further controls the displaying devices such that a sum of the brightness of the displaying device positioned from forward to backward position is kept to be a predetermined value.

By constructing in this manner, the controlling process can prevent the screen from flickering accompanying the variation of the brightness because the brightness which is composed of the brightness of all displaying devices is kept to be the predetermined value (e.g., one value or constant value) in any cases by control of the controlling process.

In another aspect of the 3D display method of the present invention, the controlling process controls the brightness on the basis of a distance from a camera device for shooting the image of the same object to the same object.

According to this aspect, controlling of the brightness of the image shown by the 3D display method of the present invention is performed on the basis of the distance from the camera device to the object. The distance from the camera device to each object is measured by a distance measuring device for example, and is recorded in correspondence with the image information, as the distance information. As the object is near to the camera device, the brightness of the forward displaying device is higher than that of the backward displaying device. On the other hand, as the object is far from the camera device, the brightness of the forward displaying device is lower than that of the backward displaying device. Therefore, a distance relationship in shooting the image of the real object can be reproduced.

The nature, utility, and further features of this invention will be more clearly apparent from the following detailed description with reference to preferred embodiments of the invention when read in conjunction with the accompanying drawings briefly described below.

DETAILED DESCRIPTION OF PREFERRED EMBODIMENTS

Figure 1:
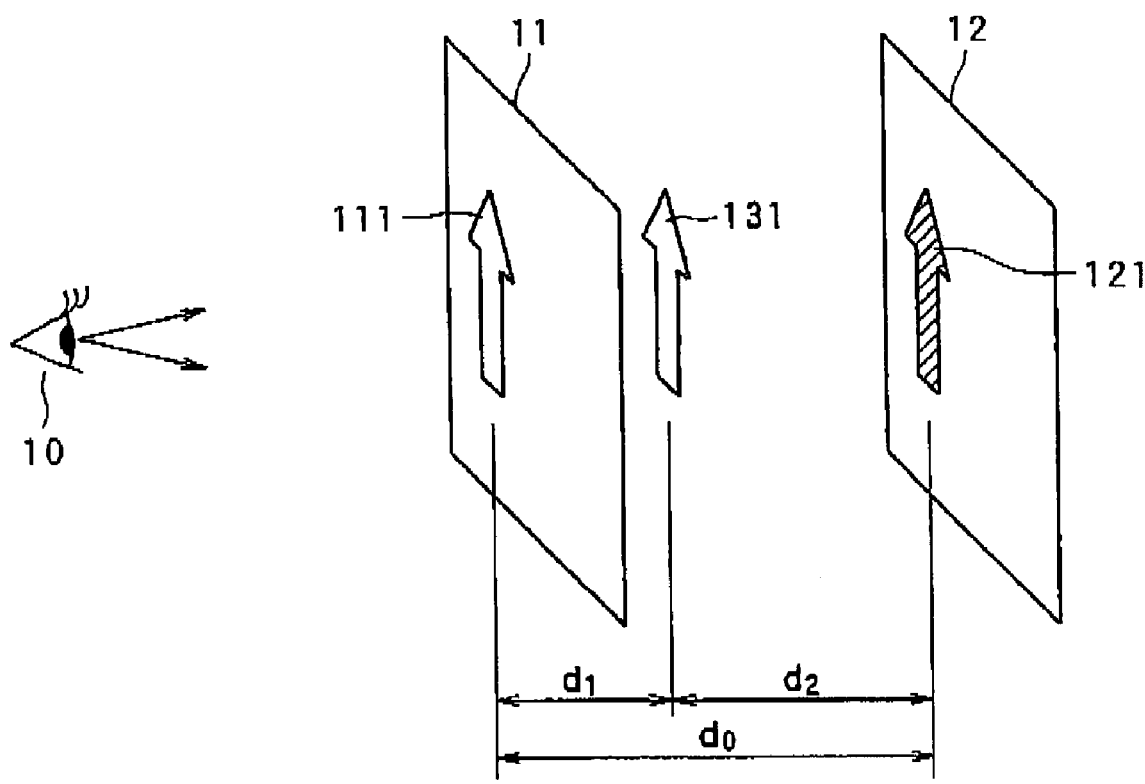
FIG. 1 is a conceptual diagram showing a display of the present embodiment associated with a 3D display apparatus and method of the present invention.
Figure 2:
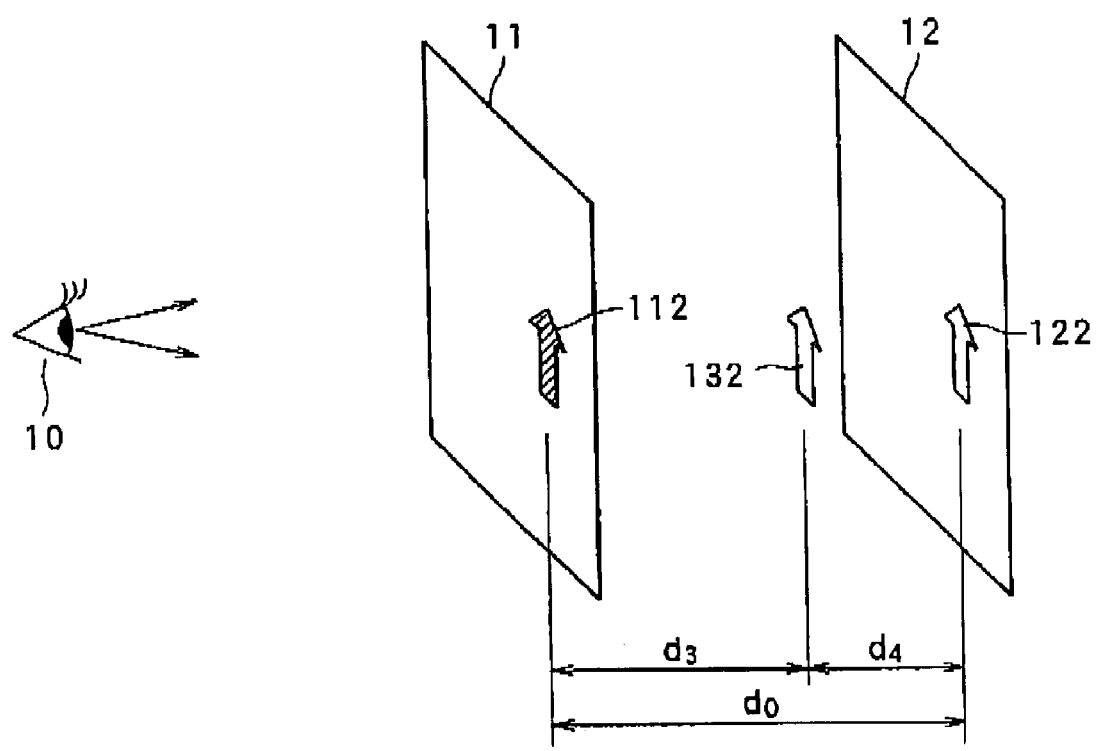
FIG. 2 is another conceptual diagram showing the present embodiment associated with the 3D display apparatus and method of the present invention.

At first, a concept of a 3D display apparatus of the present invention will be explained with reference to FIG. 1 and FIG. 2. FIG. 1 shows a condition that a viewer can perceive an object positioned relatively forward in the 3D display and FIG. 2 shows a condition that the viewer can perceive the object positioned relatively backward in the 3D display. Unless it is especially defined, "a surface" or "a front surface" of the 3D display apparatus means a surface which is directed toward the viewer (i.e., a surface which faces to the viewer), while "a back surface" of the 3D display apparatus means a surface which is directed opposite to the viewer (i.e., a surface which does not face to the viewer).

In FIG. 1, a display unit 11 and a display unit 12 are disposed parallel to each other, and are arranged on a same visual line of the viewer 10 in series at a predetermined interval d0. In this condition, about a same object, an image 111 is displayed on the display unit 11 and an image 121 is displayed on the display unit 12. The images 111 and 121 are displayed at such positions where the viewer 10 can watch the images 111 and 121 with overlapped.

At this time, the image 111 and the image 121 are displayed such that a brightness of the image 111 and a brightness of the image 121 have a predetermined relationship with each other and a sum of the brightness of the image 111 and the brightness of the image 121 is constant. By showing both of the images in this condition, a composed image 131 is perceived by the viewer 10 at a position between the display unit 11 and the display unit 12. For example, if the brightness of the image 111 is higher than that of the image 121, the image 131 can be viewed as existing backward at a distance d1 away from the display unit 11 and forward at a distance d2 away from the display unit 12 (d1<d2, d1+d2=d0).

In FIG. 2, concerning another object having a same shape of the object in FIG. 1, an image 112 is displayed on the display unit 11 and an image 122 is displayed on the display unit 12. At this time, if the brightness of the image 112 is lower than that of the image 122, a composed image 132 can be viewed as existing backward at a distance d3 away from the display unit 11 and forward at a distance d4 away from the display unit 12 (d3>d4, d3+d4=d0). At this time, the image 132 is displayed such that the sum of the brightness of the display unit 11 and the display unit 12 is constant as in the case of FIG. 1.

The image 131 is visually recognized to be in front of the image 132 by displaying the images, which are illustrated in the above described FIG. 1 and FIG. 2, alternatively at a predetermined cycle by which the afterimage effect is kept valid for the viewer 10. As this predetermined cycle, an appropriate cycle may be set, such as 1/60 second which means a field image cycle of a NTSC (National Television System Committee) type, 1/30 second which means a frame image cycle of the NTSC type, or 1/50 second which means the field image cycle of a PAL (Phase Alternation by Line) type, 1/25 second which means the frame image cycle of the PAL type or a predetermined preferable cycle, by which the afterimage effect can be maintained as the 3D display system.

(Camera Apparatus for 3D Display Image)

Next, with reference to FIG. 3, an example of a camera apparatus 1, which takes an image for 3D display, will be explained.

Figure 3:
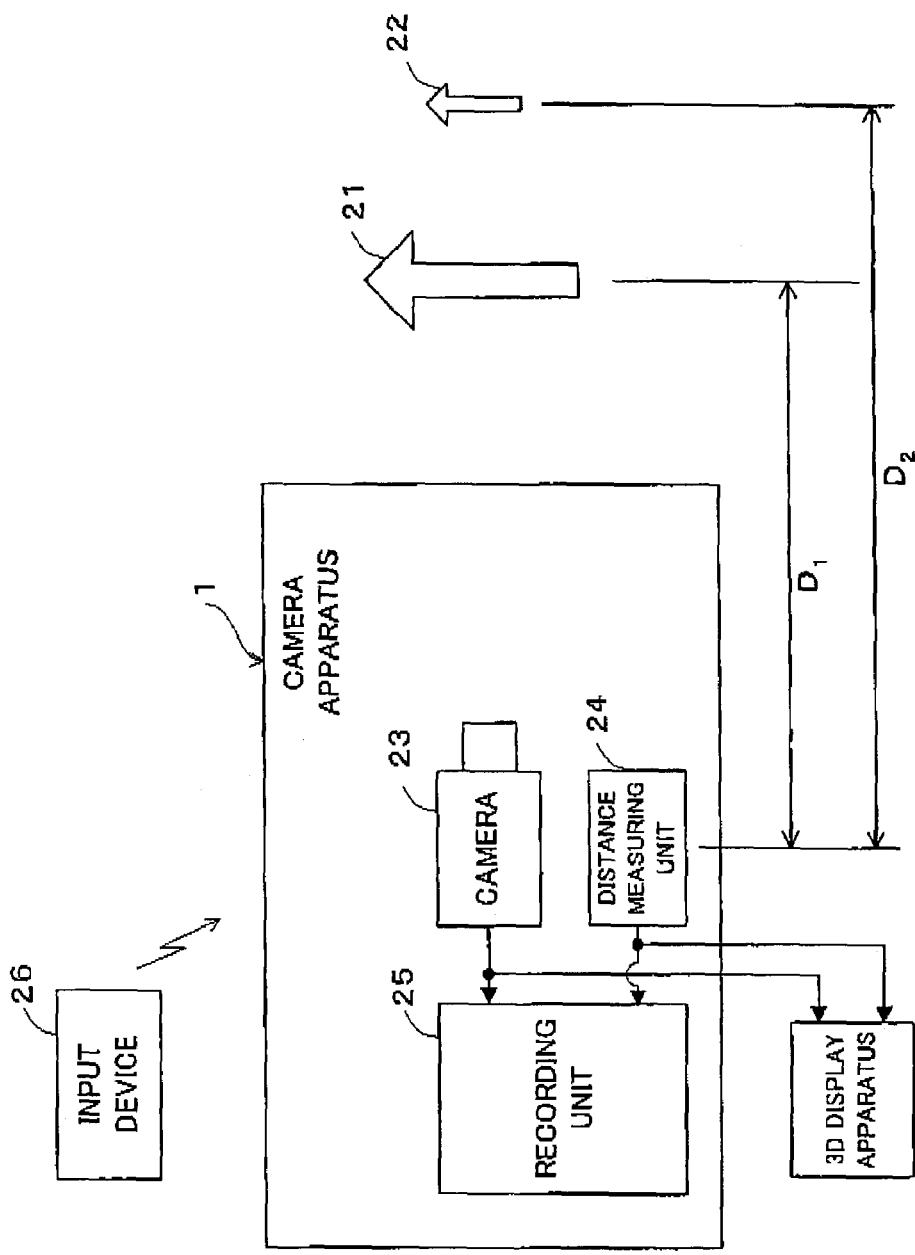
FIG. 3 is a block diagram showing a summarized structure of the embodiment associated with a camera system for shooting an image for a 3D display of the present invention.

In FIG. 3, the camera apparatus 1 is provided with, for example, a camera 23, a distance measuring unit 24 and a recording unit 25. The camera 23 may be a TV camera of the NTSC type, the PAL type or the like. The distance measuring unit 24 is to measure a distance to an object and uses for example infrared ray or ultrasonic wave. The recording unit 25, which is provided with a tape, a disc or the like as a recording medium, records data about the image which is taken by the camera 23 and the distance to the object which is detected by the distance measuring unit 24. The distance to the object or the corresponding brightness of the object may be inputted as a predetermined value by an input device 26 such as a remote-control unit, a front panel switches, a keyboard or the like.

It is assumed here that two objects, which are used to take the image for 3D display, are a first object 21 and a second object 22 respectively. The first object 21 and the second object 22 are placed as having a distance interval therebetween in back and forth directions with respect to the viewer 10. The first object 21 and the second object 22, which are placed as above described, are image-taken by the camera 23 from a direction of viewing of the viewer 10 and the image data is recorded to the recording unit 25.

At the same time as taking the image by the camera 23, each of a distance D1 to the first object 21 and a distance D2 to the second object 22 is measured by the distance measuring unit 24. The measured distance D1 and D2 are recorded by the recording unit 25 in association with the image data which is taken by the camera 23. As to a play of a 3D image, as will be described later in detail with referring to FIG. 4, the viewer 10 can perceive the images of the first object 21 and the second object 22 three-dimensionally since the images of the first object 21 and the second object 22 are displayed on a plurality of display units respectively with controlling the brightness on the basis of the distance data about these distances D1 and D2.

Further, it is possible to show the 3D image by inputting (i) the image data which is taken by the camera 23 and (ii) the distance data which is measured by the distance measuring unit 24, to the 3D display apparatus 2 directly. The distance data and the image data are not limited to the data obtained by the camera apparatus 1, it is possible to use data generated by a computer instead.

(3D Display Apparatus)

Figure 4:
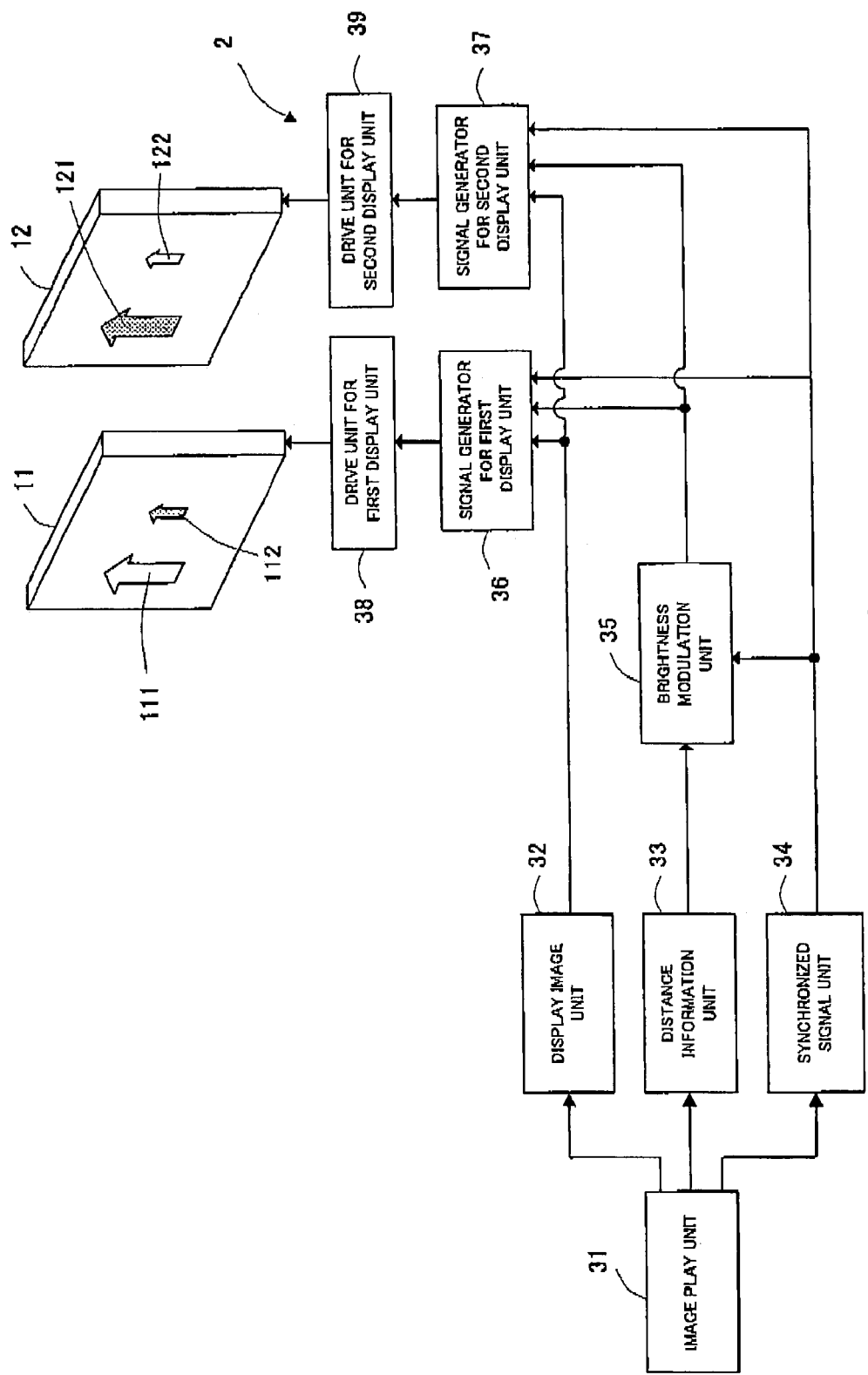
FIG. 4 is a block diagram showing a summarized structure of the embodiment associated with the 3D display device of the present invention.

Next, referring to FIG. 4, the 3D display apparatus 2 is explained. FIG. 4 shows the 3D image displayed by using the image data and the distance data, which are obtained by the above described camera apparatus 1.

In FIG. 4, the 3D display apparatus is provided with a first display unit 11, a second display unit 12, an image play unit 31, a display image unit 32, a distance information unit 33, a synchronized signal unit 34, a brightness modulation unit 35, a signal generator 36 for the first display unit, a signal generator 37 for the second display unit, a drive unit 38 for the first display unit and a drive unit 39 for the second display unit and so forth.

The first display unit 11 is disposed near to the viewer 10 and is provided with a displaying device, which self-emits and has a light transparency, for example like an EL element. The second display unit 12 is disposed distant from the viewer 10 as compared with the first display unit 11, and may be provided with a displaying device, which self-emits and has a light transparency in the same manner as the first display unit 11 such as an EL element, or may be provided with a LCD (Liquid Crystal Display) unit, a CRT (Cathode Ray Tube) display unit or the like The first display unit 11 and the second display unit 12 are placed on the same visual line of the viewer 10 with their screens being perpendicular to the visual line of the viewer 10. Further, although it is not illustrated in FIG. 4, it is possible to insert one or a plurality of display units between the first display unit 11 and the second display unit 12. The inserted display unit or units may be constructed by the displaying device, which self-emits and has the light transparency in the same manner as the first display unit 11. It is natural that each of the display units needs the driver device.

An EL element, which is used as the first display unit 11 and which may be used as the second display unit 12 as the occasion demands between the first display unit 11 and the second display unit 12, self-emits and can pass therethrough a light coming from a back thereof. The usage of self-emitting and transparent display unit characterizes the 3D display apparatus of the present invention and contributes to the size and cost reduction of the apparatus. Naturally, it is possible to use the EL display unit as the second display unit 12.

Incidentally, the display unit of the 3D display apparatus of the present invention is not limited to the EL as long as the display unit has the features of self-emitting and being transparent to the light coming from behind.

The image play unit 31 outputs the image data and the distance data by playing or reproducing a medium, for example the disc, on which (i) the image data of the first object 21 and the second object 22 and (ii) the distance data of the first object 21 and the second object 22, the images of which were taken by the camera apparatus 1, are recorded. Incidentally, this image play unit 31 is not needed, if the output of the camera 23 is directly used to show the 3D image.

The display image unit 32 generates the image data, which is to be actually displayed, out of the information which was played or reproduced by the image play unit 31. That is to say, as shown in FIG. 3, the display image unit 32 separates the image data of the first object 21 and the second object 22, the images of which were taken, and outputs the image information to a next stage for the displaying process.

The distance information unit 33 separates the information of the object, the image of which was taken, for example the first object 21 or the second object 22 shown in FIG. 3, as for the distance from the camera 23 (more precisely, from the distance measure unit 24), namely the distance data, from the played signal of the recording medium. Then, the distance information unit 33 outputs the distance data to the next stage for the displaying process. In this case, the distance data and the image data, which are played simultaneously with the distance data, keep the relationship of synchronizing with each other.

The synchronization signal unit 34 achieves a synchronization between (i) a synchronization signal in displaying the image with the played signal of the recording medium, e.g., not only the signal about a horizontal synchronization and a vertical synchronization but also the image data of the first object 21 and the second object 22 synchronized to be actually displayed and (ii) the distance data about the distance from the camera 23. In this way, the synchronization signal device 34 correlates the distance from the object with a figure showing the object.

The brightness modulation device 35 controls the brightness of the first object 21 and the second object 22 in displaying them on the first display unit 11 and the second display unit 12 in correspondence with the distance from the camera 23 to the first object 21 and the second object 22 respectively which are to be displayed, namely the distance from the viewer 10. The control makes the brightness of the first object 21 displayed on the first display unit 11 be higher than that of the first object 21 displayed on the second display unit 12 and also makes the brightness of the second object 22 which is displayed on the first display unit 11 be lower than that of the second object 22 which is displayed on the second display unit 12, on an assumption that the first object 21 is placed nearer to the viewer 10 than the second object 22 is.

Incidentally, the first object 21 and the second object 22 are displayed in the different field or frame considering the afterimage effect of the viewer 10. Therefore a brightness which is composed of (i) the brightness of the first display unit 11 and (ii) that of the second display unit 12 in showing the first object 21 is set to be equal to a brightness which is composed of (i) the brightness of the first display unit 11 and (ii) that of the second display unit 12 in showing the second object 22 in order to remove unnaturalness in vision.

The signal generator 36 for the first display unit generates a signal of the image which is to be displayed on the first display unit 11 on the basis of a signal of the display image unit 32 and the brightness modulation unit 35 and the synchronization signal unit 34. The image signal which is generated here makes the brightness in displaying the first object 21 high and also makes the brightness in displaying the second object 22 low, on an assumption that the first object 21 is nearer to the viewer 10 than the second object 22 is. The synchronization signal for displaying is added to this image signal generated in this manner.

The signal generator 37 for the second display unit generates a signal of the image is to be displayed on the second display unit 12 on the basis of the signal of the display image unit 32 and the brightness modulation unit 35 and the synchronization signal unit 34. The image signal which is generated here makes the brightness in displaying the first object 21 low and the brightness in displaying the second object 22 high, on an assumption that the first object 21 is nearer to the viewer 10 than the second object 22 is. The synchronization signal for displaying is added to this image signal generated in this manner.

The drive unit 38 for the first display unit converts the image signal which is sent from the signal generator 36 for the first display unit into a drive waveform corresponding to the kind of the first display unit 11, for example the EL display unit. The drive unit 38 for the first display unit gets a voltage and a current for the driving and applies the voltage and the current to the first display unit 11 and makes the display unit 11 display the image.

The drive unit 39 for the second display unit converts the image signal which is sent from the signal generator 37 for the second display unit into the drive waveform corresponding to the kind of the second display unit 12, for example the EL display unit, LCD unit, CRT display unit or the like. The drive unit 39 for the second display unit gets a voltage and a current for the driving and applies the voltage and the current to the second display unit 12 and makes the display unit 12 display the image.

The viewer 10 can perceive the 3D image since the image signal generated as above described is displayed on the first display unit 11 and the second display unit 12.

Firstly, the image 111 of the first object 21 is displayed on the first display unit 11 and the image 121 of the first object 21 is displayed on the second display unit 12. The image 111 and the image 121 synchronize with each other and are displayed at the position coincident with the visual line of the viewer 10. The brightness of the image 111 is higher than that of the image 121. In this case, the viewer 10, as shown in FIG. 1, can perceive the image 131 at a position which is near to the first display unit 11.

On the other hand, in the next displaying cycle, the image 112 of the second object 22 is displayed on the first display unit 11 and an image 122 of the second object 22 is displayed on the second display unit 12. The image 112 and the image 122 synchronize with each other and are displayed at the position coincident with the visual line of the viewer 10. The brightness of the image 122 is higher than that of the image 112. In this case, the viewer 10, as shown in FIG. 2, can perceive the image 132 at a position which is near to the second display unit 12.

In this manner, the viewer 10 can watch the first object 21 and the second object 22 which are placed back and forth and thereby perceive the 3D image by repeating the image which is displayed as mentioned above within the afterimage time of the viewer 10.

Incidentally, the 3D display apparatus of the present invention has a character of actualizing a small-sized and cost-reduced apparatus since it is constructed such that the viewer can watch the image displayed on the backward display unit through the forward display unit, by employing as the forward display unit a display unit which self-emits and has the light transparency. Therefore, the camera apparatus and the 3D display apparatus are not limited to above description. It is possible to be designed a device and a structure which have a same operation or function.

1st EMBODIMENT OF IMAGE DISPLAYING DEVICE IN 3D DISPLAY APPARATUS

The first embodiment of the image displaying device will be explained with reference to FIG. 5.

Figure 5:
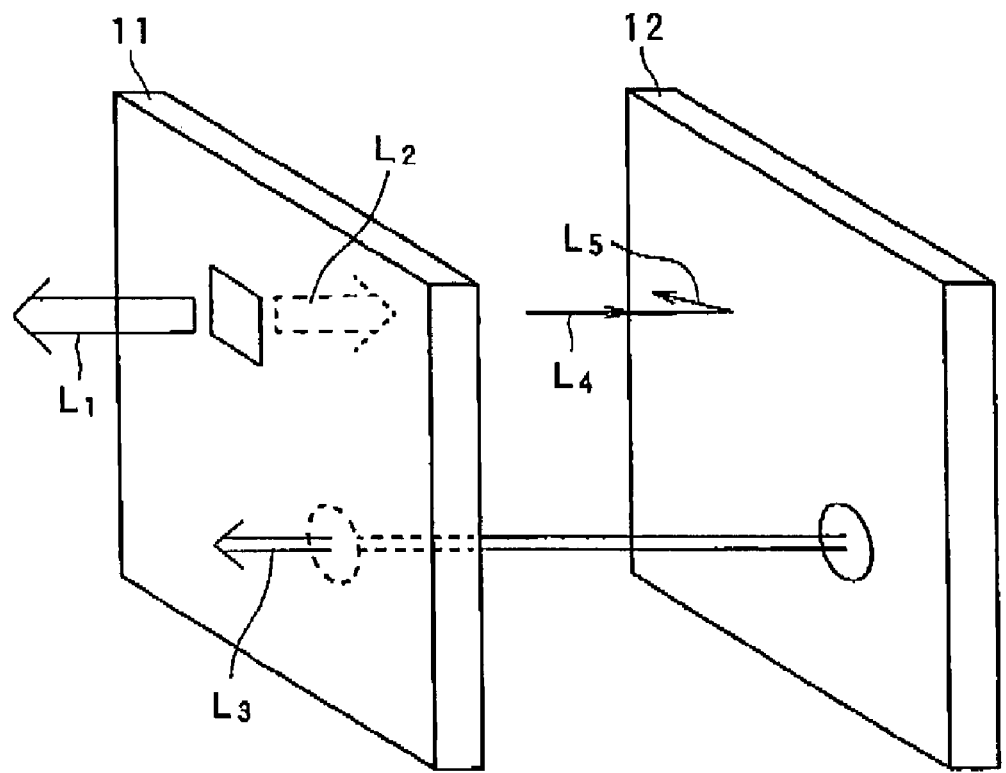
FIG. 5 is a schematic perspective view showing first and second embodiments associated with a device for displaying an image of the 3D display apparatus of the present invention.

As shown in FIG. 5, the first display unit 11 of the present embodiment has a displaying device, which displays the image by self-emitting (as indicated by self-emitted lights L1 and L2) and which passes therethrough the light L3 coming from the back side thereof, for example the EL element. Accordingly, the viewer 10 can watch the image, which is displayed on the second display unit 12, through the first display unit 11 in addition to the image which is displayed on the first display unit 11. This device can make the 3D display apparatus small-sized.

2nd EMBODIMENT OF IMAGE DISPLAYING DEVICE IN 3D DISPLAY APPARATUS

The second embodiment of the image displaying device will be explained with reference to the FIG. 5 in the same way.

As shown in FIG. 5, the first display unit 11 of the present embodiment has a displaying device, which displays the image by self-emitting (as indicated by self-emitted lights L1 and L2) and which passes therethrough the light L3 coming from the back side thereof, for example the EL element. The displaying device, the amount of the light of the surface of which is greater than that of the back surface, is employed in the second embodiment. It is possible to actualize such a displaying device by employing an illuminating element of the displaying device, which emits the light from the surface more than from the back surface. The light L2 emitted from the back face reaches at the second display unit 12 as a light L4 and a reflection light L5 on the surface of the second display 12 returns to the first display unit 11. The reflection light L5 may more or less harm for showing the image. Because of this, it is possible to improve the quality of the 3D image by reducing the light L2 emitted from the back face, namely the reflection light L5 on the surface of the second display unit 11.

3rd EMBODIMENT OF IMAGE DISPLAYING DEVICE IN 3D DISPLAY APPARATUS

The third embodiment of the image displaying device will be explained with reference to the FIG. 6.

Figure 6:
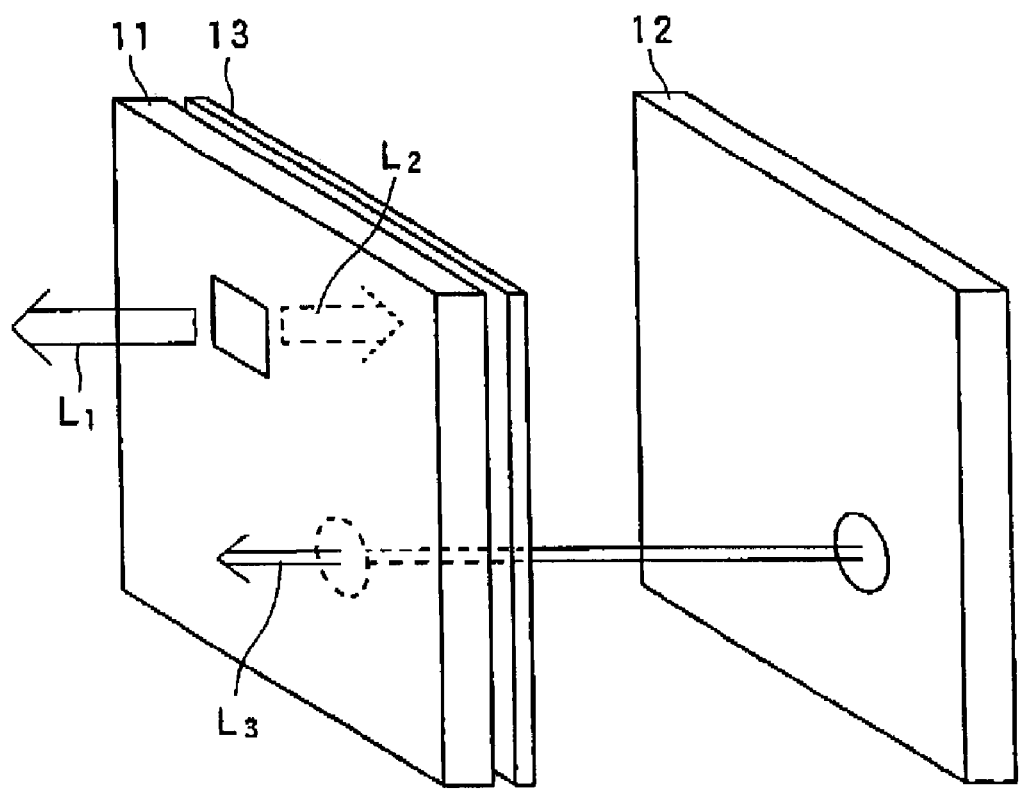
FIG. 6 is a schematic perspective view showing a third embodiment associated with the device for displaying the image of the 3D display apparatus of the present invention.

As shown in FIG. 6, the first display unit 11 of the present embodiment has a displaying device, which displays the image by self-emitting (as indicated by self-emitted lights L1 and L2) and which passes therethrough the light L3 coming from the back side thereof, for example the EL element. Further, the back surface of the displaying device is provided with a half mirror 13. The light L2 emitted from the first display unit 11 toward the second display unit 12 is in fact cut off by the half mirror 13 and, on the other hand, the light L3 emitted from the second display unit 12 can pass through the half mirror 13 and the first display unit 11. Therefore, the viewer 10 can watch the image which is displayed on the second display unit 12 through the half mirror 13 and the first display unit 11. It is possible to improve the quality of the 3D image because of preventing the light L2 which is emitted from the back of the display unit 11 from reflecting on the second display unit 12 and returning to the side of the viewer 10.

4th EMBODIMENT OF IMAGE DISPLAYING DEVICE IN 3D DISPLAY APPARATUS

The forth embodiment of the image displaying device will be explained with reference to the FIG. 7.

Figure 7:
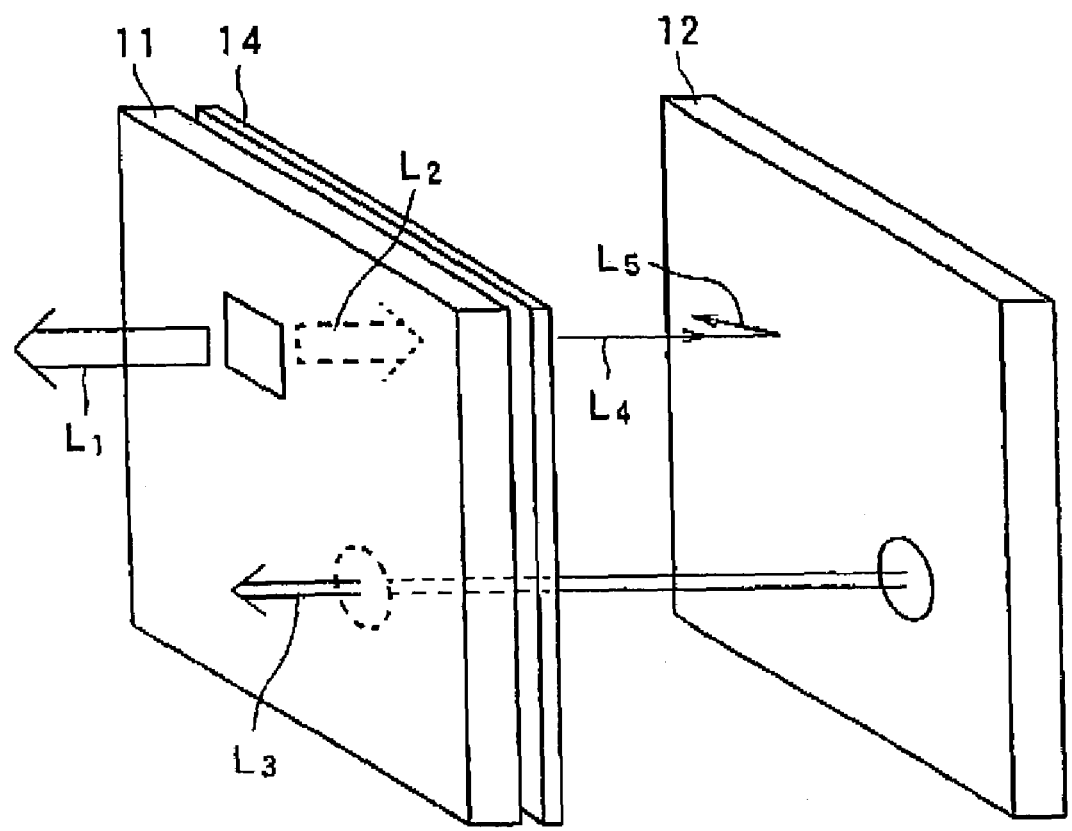
FIG. 7 is a schematic perspective view showing a forth embodiment associated with the device for displaying the image of the 3D display apparatus of the present invention.

As shown in FIG. 7, the first display unit 11 of the present embodiment has a displaying device, which displays the image by self-emitting (as indicated by self-emitted lights L1 and L2) and which passes therethrough the light L3 coming from the back side thereof, for example the EL element. Further, the back surface of the displaying device is provided with an optical filter 14. The light passing from a side of the viewer 10 to an opposite side of the viewer 10 through the optical filter 14 is weaker than the light passing from the opposite side of the viewer 10 to the side of the viewer 10 through the optical filter 14. Because of the optical filter 14, the light L4 emitted from the first display unit 11 to the second display unit 12 is reduced, while the amount of the attenuation of the light L3 which is emitted from the second display 12 unit in passing through the optical filter 14 is small. Therefore, the viewer 10 can watch the image which is displayed on the second display unit 12 through the first display unit 11. It is possible to improve the quality of the 3D image because the reflection light L5 on the second display unit 12 is very weak.

5th EMBODIMENT OF IMAGE DISPLAYING DEVICE IN 3D DISPLAY APPARATUS

The fifth embodiment of the image displaying device will be explained with reference to the FIG. 8.

Figure 8:
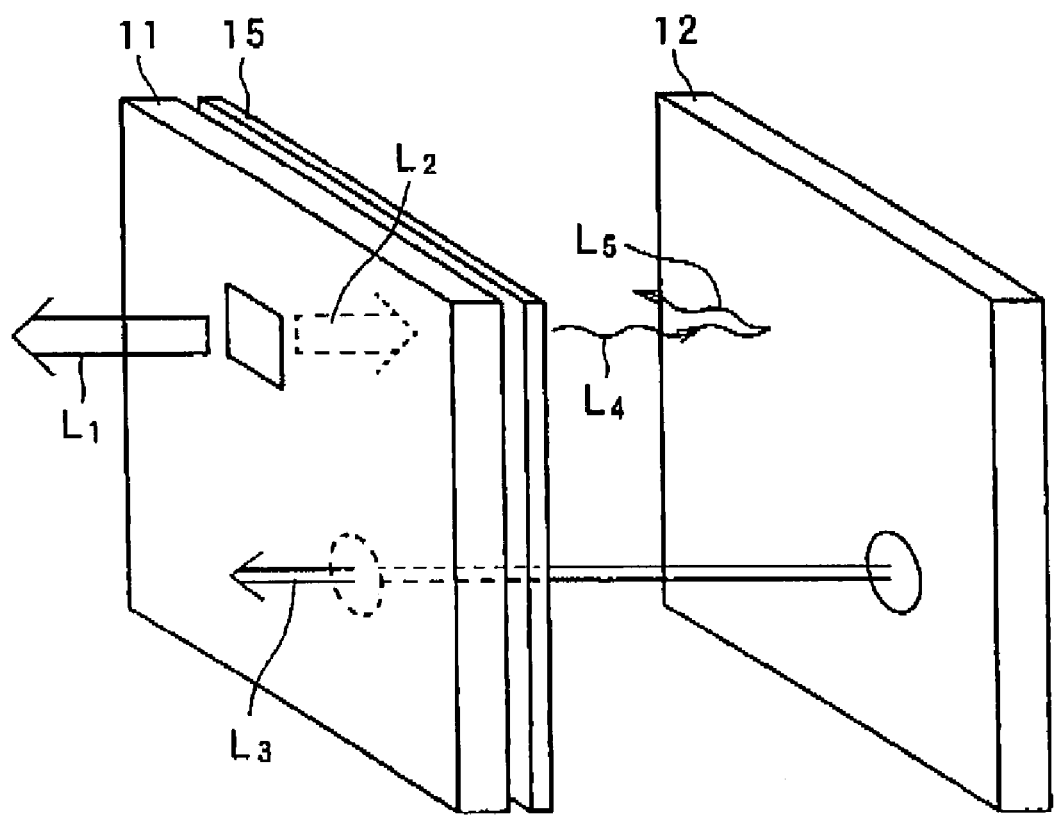
FIG. 8 is a schematic perspective view showing a fifth embodiment associated with the device for displaying the image of the 3D display apparatus of the present invention.

As shown in FIG. 8, the first display unit 11 of the present embodiment has a displaying device, which displays the image by self-illuminating (as indicated by self-illuminated lights L1 and L2) and which passes therethrough the light L3 coming from the back side thereof, for example the EL element. Further, the back surface of the displaying device is provided with a polarizing plate 15. Because of the polarizing plate 15, the light L4 emitted from the first display unit 11 to the second display unit 12 is polarized. The reflection light L5 which reflects on the second display unit 12 is cut off in passing through the polarizing plate 15 again and can hardly or not reach the viewer 10. On the other hand, the light L3 emitted from the second display unit 12 can pass through the polarizing plate 15. Therefore the viewer 10 can watch the image which is displayed on the second display unit 12 through the first display unit 11. It Is possible to improve the quality of the 3D image because the light reflection L5 can hardly or not return to the viewer 10.

6th EMBODIMENT OF IMAGE DISPLAYING DEVICE IN 3D DISPLAY APPARATUS

The sixth embodiment of the image displaying device will be explained with reference to the FIG. 9.

Figure 9:
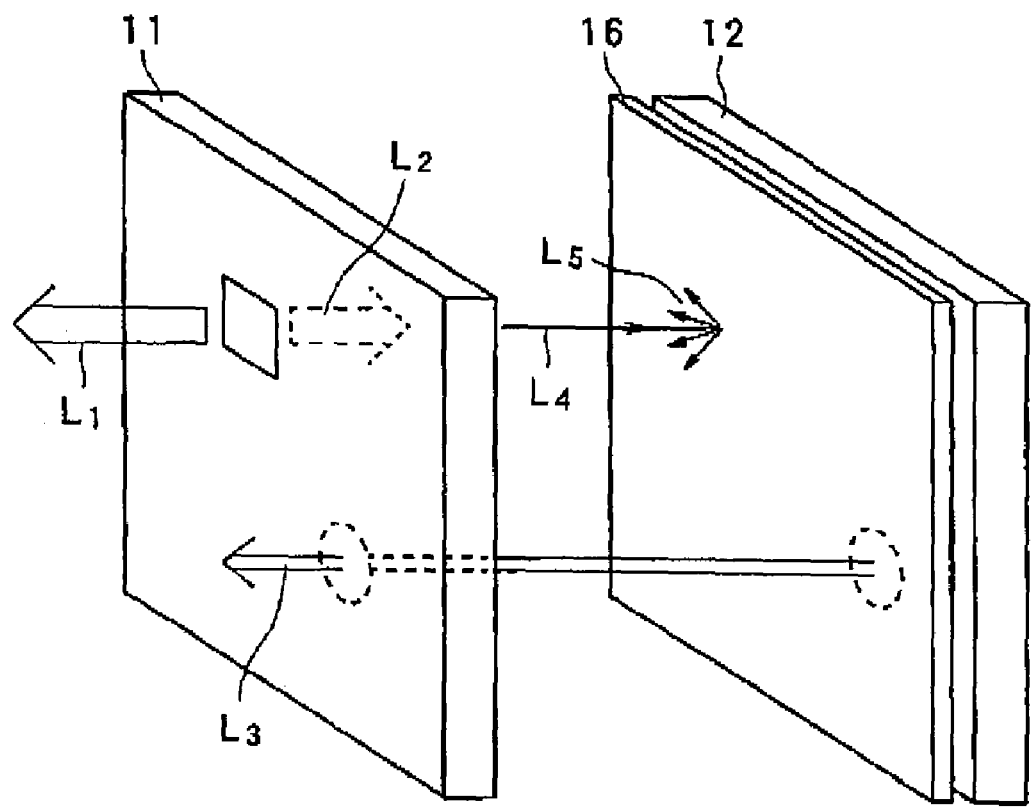
FIG. 9 is a schematic perspective view showing a sixth embodiment associated with the device for displaying the image of the 3D display apparatus of the present invention.

As shown in FIG. 9, the first display unit 11 of the present embodiment has a displaying device, which displays the image by self-illuminating (as indicated by self-illuminated lights L1 and L2) and which passes therethrough the light L3 coming from the back side thereof, for example the EL element. The surface of the second display unit 12 is provided with an anti-reflection film 16. The light L4 emitted from the first display unit 11 to the second display unit 12 is reduced by the anti-reflection film 16. Therefore, the reflection light L5 of the light L4 hardly returns to the viewer 10. On the other hand, the light L3 emitted from the second display unit 12 can pass through the anti-reflection 16. Therefore, the viewer 10 can watch the image which is displayed on the second display unit 12 through the first display unit 11. It is possible to improve the quality of the 3D image because the reflection light L5 on the second display unit 12 hardly returns to the viewer 10.

Incidentally, instead of providing with the anti-reflection film 16 on the surface of the second display unit 12, it is possible to employ means for reducing the reflection light L5, for example an anti-reflection processing or anti-reflection film coating process on the surface of the second display unit 12 may be applied by a machinery device or a chemical device, or alternatively a light scatter plate may be attached.

The first to sixth embodiments of the image displaying device have been explained above. It is natural to combine two or more of them within the technically available scope. For example, the amount of the light directed from the displaying unit, which is positioned front, toward the back side thereof may be reduced, while the anti-reflection film may be equipped on the surface of the displaying unit, which is positioned back.

As described above, according to the present embodiment, the 3D display method of the brightness modulation type can be realized by using a relatively easy structure and control.

In addition, it is possible for the viewer to watch a plurality of objects with recognizing their back and forth distance relationship, by displaying the plurality of objects alternatively, which have different depths to each other, with controlling the brightness on two displaying devices which are placed back and force, within the time duration while the afterimage effect of the viewer is kept valid.

Although the example of the 3D display in the above described, one or a combination of the first to sixth embodiment can show a 2D image.

Figure 11:
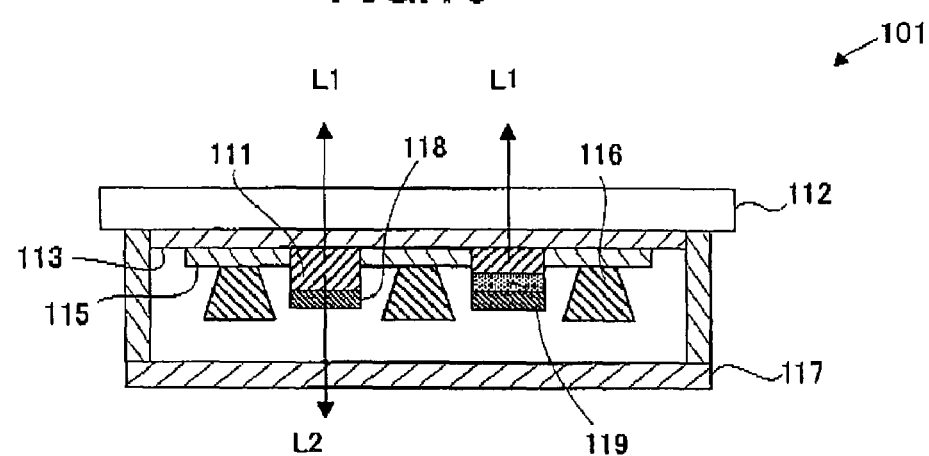
FIG. 11 is a schematic sectional view showing another more detailed example of the second embodiment associated with the device for displaying the image of the 3D display apparatus of the present invention.
Figure 12:
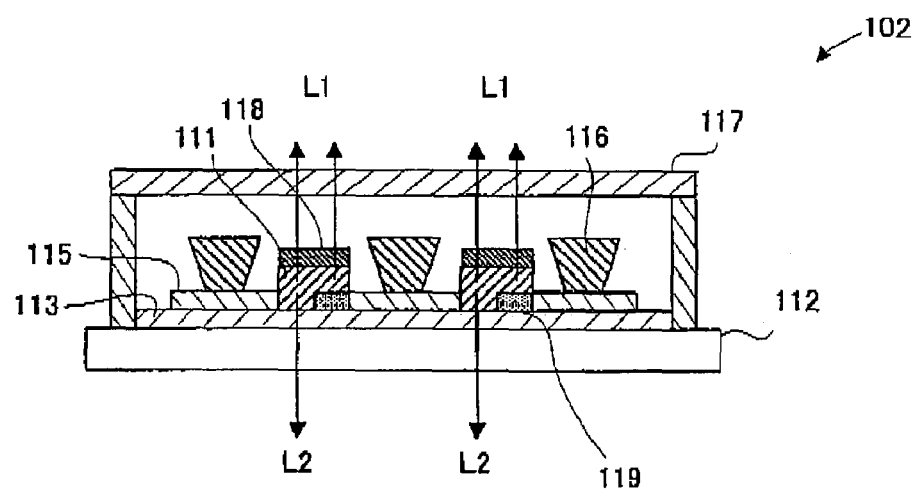
FIG. 12 is a schematic sectional view showing another more detailed example of the second embodiment associated with the device for displaying the image of the 3D display apparatus of the present invention.

Further, more concrete examples of the first displaying device 11 having such a structure that the emitting amount of the light in the forward direction is increased and that the emitting amount of the light L2 from the back surface is decreased in the above described second embodiment will be explained with reference to the FIG. 10 to FIG. 12. Each of FIGS. 10 to 12 shows a diagram that illustrates a concrete structure of the first display unit 11 which is used in the second embodiment.

Figure 10:
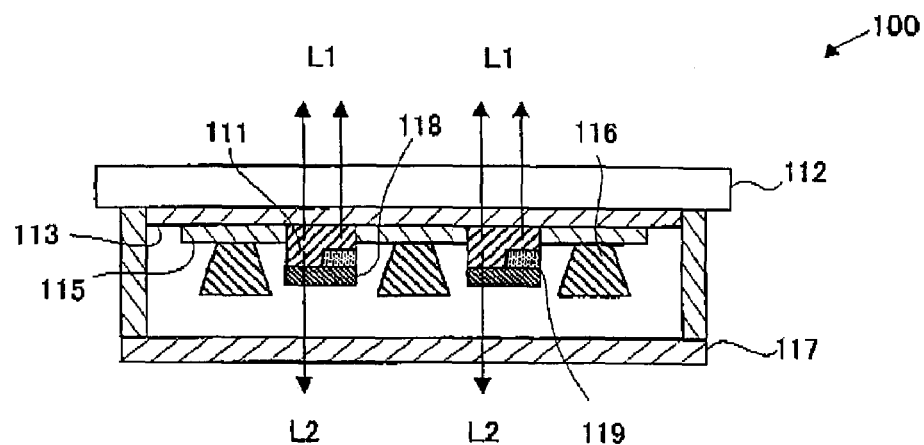
FIG. 10 is a schematic sectional view showing a more detailed example of the second embodiment associated with the device for displaying the image of the 3D display apparatus of the present invention.

As shown in FIG. 10, an organic EL display unit 100 may be used as the first display unit 11 in the second embodiment. The organic EL display unit 100 has an organic EL emitting layer 111, a substrate 112, an ITO (Indium Tin Oxide) electrode (anode) 113, an insulation film 115, a cathode separator 116, a transparent glass sealing can 117, a transparent electrode 118 and a reflection plate 119.

The organic EL emitting layer 111 comprises a hole injection layer, a hole transporting layer, a light emitting layer, an electron transporting layer and an electron injection layer, which are not illustrated in FIG. 10. The hole injection layer may be composed of for example a CuPc (Copper Phthalocyanine). The hole transporting layer may be composed of for example a NPB (N, N-di(naphthalene-1-yl)-N, N-diphenyl-benzidene). The light emitting layer may be composed of an Alqzs (a tris-(8-hydroxyquinoline) aluminum). The electron transporting layer may be composed of for example a BCP (a bathocuproine). The electron injection layer is composed of for example a LiF (Lithium fluoride).

The substrate 112 is used to protect and support the organic EL emitting layer 111. The substrate 112 may comprise a glass substrate. A polymer substrate may be used as the substrate 112. The viewer 10 watches an image which is made of a light emitted by the organic EL emitting layer 111 through the substrate 112.

The ITO electrode 113 is an anode electrode having the light transparency property. An IZO (Indium Zinc Oxide) electrode may be used as the anode electrode instead of the ITO electrode.

The insulation film 115 is used to prevent an electricity-leak. The insulation film 115 may be composed of a polyimide and formed on the substrate 113 except a part of the substrate 113 where the organic EL emitting layer 111 is to be formed.

The cathode separator 116 is used to make a cathode (namely the transparent electrode 118) an arbitrary shape in patterning the cathode. The cathode separator 116 is formed on the insulation film 115 except a part where the cathode is to be formed.

The transparent glass sealing can 117 is to protect the above described elements from the outer influence. Alternatively, a transparent sealing film may be used instead of the transparent glass sealing can 117.

The transparent electrode 118 is the cathode electrode including for example the ITO, which has the light transparency property. The transparent electrode 118 may comprise IZO or a metal electrode in a film shape.

The reflection plate 119 may be composed of a metal, like for example an aluminum, whose reflection rate is high. The reflection plate 119 is preferred to be disposed on at least a part of a boundary surface between the organic EL emitting layer 111 and transparent electrode 118.

The organic EL display unit 100, which has the above described structure, makes a light, which is emitted from the entire organic EL emitting layer 111, pass to a direction of the front surface thereof. On the other hand, the organic EL display unit 100 makes a light, which is emitted from the organic EL emitting layer 111 except a part of the organic EL emitting layer 111 where the reflection plate 119 is not formed, pass to a direction of the back surface thereof. Therefore, like the first display unit 11 of the above described second embodiment, it is possible to realize the display unit which emits the light from the front surface more than from the back surface and emits the less light L2 from the back surface.

As shown in FIG. 11, an organic EL display unit 101, which has a structure that at least a part of the organic EL emitting layer 111 has the reflection plate 119 and another part of the organic EL emitting layer 111 doesn't have the reflection plate 119, can have same advantage as the above described organic EL display unit 100.

Namely, a light, which is emitted from both of (i) the organic EL emitting layer 111 which doesn't have the reflection plate 119 and (ii) the organic EL emitting layer 111 which has the reflection plate 119, passes to the direction of the front surface. On the other hand, a light emitted from only the organic EL emitting layer 111 which doesn't have the reflection plate 119 passes to the direction of the back surface.

Therefore, like the structure shown in FIG. 10, it is possible to realize the display unit which emits the light from the front surface more than from the back surface and emits the less light L2 from the back surface.

About the above described the organic EL display unit 100 and 101, the light L1 shown in FIG. 5 is equivalent to the light emitted toward the substrate 112. The light L2 shown in FIG. 5 is equivalent to the light emitted toward the opposite side of the substrate 112. However, it is not limited to this, the light L1 shown in FIG. 5 may be equivalent to the light emitted toward the opposite side of the substrate 112, while the light L2 shown in FIG. 5 may be equivalent to the light emitted toward the substrate 112. As an organic EL display unit 102 in this case, the reflection plate 119 is preferred to be disposed on a boundary surface or at least a part of the boundary surface between the organic EL emitting layer 111 and the ITO electrode 113 as shown in FIG. 12.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Applications No. 2002-134564 filed on May 9, 2002 and No. 2003-115362 filed on Apr. 21, 2003 including the specifications, claims, drawings and summaries are incorporated herein by reference in their entireties.

What is claimed is:

1. A three dimensional display apparatus comprising:
   a plurality of displaying devices which are arranged on a visual line of a viewer in series at a predetermined interval;
   a controlling device for controlling the displaying devices to respectively display images, so as to show a three dimensional image for the viewer;
   at least one of the displaying devices except for a displaying device which is positioned farthest from the viewer comprising an image displaying surface having both a self-emitting property and a light transparency property, said at least one of the displaying devices emitting light both toward the viewer and away from the viewer; and
   a reducing device for reducing an amount of light constituting an image noise coming toward the viewer, which is generated by a reflection of light emitted away from the viewer onto a surface of one of said displaying devices which is behind said at least one of the displaying devices.

2. The three dimensional display apparatus according to claim 1, wherein said controlling device controls the displaying devices to respectively display the images of a same object at a substantially same screen position of respective one of the displaying devices.

3. The three dimensional display apparatus according to claim 2, wherein said controlling device controls the display devices such that one of the displaying devices which is positioned forward displays one image of the same object with a higher brightness than other of the displaying devices positioned backward if the three dimensional image is to be shown nearer to the viewer, and such that one of the displaying devices which is positioned backward displays one image of the same object with a higher brightness than other of the displaying devices positioned forward if the three dimensional image is to be shown farther from the viewer.

4. The three dimensional display apparatus according to claim 3, wherein said controlling device further controls the displaying devices such that a sum of the brightness of the displaying device positioned from forward to backward position is kept to be a predetermined value.

5. The three dimensional display apparatus according to claim 3, wherein the controlling device controls the brightness on the basis of a distance from a camera device for shooting the image of the same object to the same object.

6. The three dimensional display apparatus according to claim 3, further comprising an input device through which the brightness is set to be a desired value.

7. The three dimensional display apparatus according to claim 1, wherein said at least one of the displaying devices self-emits such that an amount of a self-emitted light directed toward the viewer is more than that directed away from the viewer, as said reducing device.

8. The three dimensional display apparatus according to claim 1, wherein said at least one of the displaying devices has a half mirror on a back side thereof, as said reducing device.

9. The three dimensional display apparatus according to claim 1, wherein said at least one of the displaying devices has a filter on a back side thereof, such that an amount of a self-emitted light directed away from the viewer through the filter is less than that directed toward the viewer through the filter, as said reducing device.

10. The three dimensional display apparatus according to claim 1, wherein said at least one of the displaying devices has a polarizing plate on a back side thereof, as said reducing device.

11. The three dimensional display apparatus according to claim 1, wherein said at least one of the displaying devices is anti-reflection processed on a back side surface thereof, as said reducing device.

12. The three dimensional display apparatus according to claim 1, wherein the other of the displaying devices positioned backward is anti-reflection processed on a front side surface thereof, as said reducing device.

13. The three dimensional display apparatus according to claim 1, wherein the other of the displaying devices positioned backward has a light scattering plate on a front side surface thereof, as said reducing device.

14. The three dimensional display apparatus according to claim 1, wherein said at least one of the displaying devices comprises an EL (Electro-Luminescence) element.

15. The three dimensional display apparatus according to claim 1, wherein said displaying device positioned farthest from the viewer comprises an image displaying surface not having the light transparency property.

16. A three dimensional display method using a three dimensional display apparatus comprising (i) a plurality of displaying devices which are arranged on a visual line of a viewer in series at a predetermined interval and (ii) a controlling device for controlling the displaying devices to respectively display images, so as to show a three dimensional image for the viewer, at least one of the displaying devices except for a displaying device which is positioned farthest from the viewer comprising an image displaying surface having both of a self-emitting property and a light transparency property, said method comprising the processes of:

generating image signals for the displaying devices to respectively display the images;

controlling the displaying devices on the basis of the generated image signals to respectively display the images of a same object at a substantially same screen position of respective one of the displaying devices; and reducing an amount of light constituting an image noise coming toward the viewer with a reducing device, the image noise being generated by a reflection of light emitted in a direction away from the viewer onto a surface of one of the displaying devices which is behind said at least one of the displaying devices.

17. The three dimensional display method according to claim 16, wherein said controlling process comprises the processes of:

controlling the display devices such that one of the displaying devices which is positioned forward displays one image of the same object with a higher brightness than other of the displaying devices positioned backward if the three dimensional image is to be shown nearer to the viewer; and controlling the display devices such that one of the displaying devices which is positioned backward displays one image of the same object with a higher brightness than other of the displaying devices positioned forward if the three dimensional image is to be shown farther from the viewer.

18. The three dimensional display method according to claim 17, wherein said controlling process further controls the displaying devices such that a sum of the brightness of the displaying device positioned from forward to backward position is kept to be a predetermined value.

19. The three dimensional display method according to claim 16, wherein the controlling process controls the brightness on the basis of a distance from a camera device for shooting the image of the same object to the same object.

* * * * *